(12) United States Patent
Probst

(10) Patent No.: US 6,893,777 B2
(45) Date of Patent: May 17, 2005

(54) CURRENT COLLECTOR HAVING NON-SYMMETRIC GRID PATTERN CONVERGING AT A COMMON FOCAL POINT

(75) Inventor: Joseph M. Probst, Williamsville, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 432 days.

(21) Appl. No.: 10/074,369

(22) Filed: Feb. 12, 2002

(65) Prior Publication Data

US 2002/0146625 A1 Oct. 10, 2002

Related U.S. Application Data

(60) Provisional application No. 60/269,131, filed on Feb. 15, 2001.

(51) Int. Cl.[7] ................................................ H01M 4/72
(52) U.S. Cl. ................... 429/233; 429/237; 429/238; 429/241; 429/244; 29/2; 29/623.1
(58) Field of Search ..................... 29/2, 623.1; 428/58, 428/137; 429/233, 234, 236, 237, 238, 241, 242, 243, 244, 245, 225

(56) References Cited

U.S. PATENT DOCUMENTS

| | | | | |
|---|---|---|---|---|
| 1,044,831 A | * | 11/1912 | Wackwitz | 429/239 |
| 1,440,354 A | | 12/1922 | Hanna | |
| 1,528,963 A | | 3/1925 | Adams et al. | |
| 2,503,970 A | | 4/1950 | Rupp | |
| 3,453,145 A | * | 7/1969 | Duddy | 429/244 |
| 3,490,954 A | | 1/1970 | Babusci et al. | |
| 3,989,539 A | | 11/1976 | Grabb | |
| 4,091,192 A | * | 5/1978 | Scholle | 429/211 |
| 4,118,553 A | | 10/1978 | Buckethal et al. | |
| 4,221,852 A | | 9/1980 | Qureshi | |
| 4,250,235 A | | 2/1981 | DuPont et al. | |
| 4,320,183 A | | 3/1982 | Qureshi | |
| 4,477,546 A | | 10/1984 | Wheeler et al. | |
| 4,528,255 A | | 7/1985 | Hayes et al. | |
| 5,169,659 A | | 12/1992 | Fleischmann et al. | |
| 5,434,019 A | | 7/1995 | Zhang et al. | |
| 5,498,496 A | | 3/1996 | Sasaki et al. | |
| 5,582,936 A | | 12/1996 | Mrotek et al. | |
| 5,989,749 A | | 11/1999 | Kao et al. | |
| 6,566,010 B1 | * | 5/2003 | Bhardwaj et al. | 429/225 |

FOREIGN PATENT DOCUMENTS

| | | | | |
|---|---|---|---|---|
| EP | 0532313 | * | 3/1993 | ............ H01M/6/14 |
| FR | 1.010.039 | | 6/1952 | |
| GB | 10104093 | | 2/1968 | |

OTHER PUBLICATIONS

Patent Abstracts of Japan vol. 009, No. 318 (E–366), Dec. 1985 & JP 60 150556 A (Nihon Denchi KK), Aug. 8, 1985.
EP 0 532 313 A (Greatbatch W Ltd) Mar. 17, 1993 * figures *.

* cited by examiner

Primary Examiner—Bruce F. Bell
Assistant Examiner—Monique Wills
(74) Attorney, Agent, or Firm—Michael F. Scalise

(57) ABSTRACT

The present invention relates to a current collector for an electrochemical cell. The current collector has a unique grid structure comprised of a frame supporting a plurality of radial strands as conductors radiating outwardly from a focal point on a connector tab. The frame and radial conductors are maintained in a fan-like orientation with respect to each other by two groups of concentric conductor strands, one located adjacent to the tab, the other spaced a substantial distance therefrom. The radiating conductors provide a more direct path to the connector tab for electron flow. This results in the current collector having reduced internal resistance in comparison to conventional current collector designs.

17 Claims, 6 Drawing Sheets

CURRENT COLLECTOR HAVING NON-SYMMETRIC GRID PATTERN CONVERGING AT A COMMON FOCAL POINT

CROSS REFERENCE TO RELATED APPLICATION

This application claims priority from provisional application Ser. No. 60/269,131, filed Feb. 15, 2001.

FIELD OF THE INVENTION

The present invention relates to the conversion of chemical energy to electrical energy. More particularly, the present invention relates to a current collector having lower internal resistance (Rdc) in comparison to current collectors of a conventional design. The present current collector is useful in electrochemical cells of both aqueous and non-aqueous chemistries.

BACKGROUND OF THE INVENTION

Present electrochemical cell designs utilize two primary construction methods. Either the internal electrodes are spirally wound or, they are assembled in a multiple plate configuration. In either case, each of the positive and negative electrodes is comprised of a current collector and active chemical constituents contacted thereto. The current collector can either be the casing housing the cell or, a conductive foil or screen.

The current collector of the present invention is useful in both cell types for either primary or secondary chemistries and has a unique grid structure comprised of a frame supporting a plurality of radial strands as conductors radiating outwardly from a focal point on a connector tab. The frame and radial conductors are maintained in a fan-like and generally planar orientation with respect to each other by two groups of concentric conductor strands, one located adjacent to the tab, the other spaced a substantial distance therefrom. While the spaced apart groups of concentric conductor strands maintain proper spacing and structural integrity for the current collector grid, the radiating conductors provide a more direct path to the connector tab for electron flow. This results in the current collector having reduced internal resistance in comparison to conventional current collector designs.

SUMMARY OF THE INVENTION

A characteristic of any electrochemical cell is its internal resistance (Rdc). It is well known that the design, shape and configuration of a current collector and its grid pattern affect Rdc. Placing an external load on an electrochemical cell causes a chemical reaction that produces a flow of electrons through the current collector to the associated external battery terminal. The basis of the present invention is to reduce Rdc by reducing the flow path of electrons. In other words, the distance electrons must travel between all points on the current collector and the cell terminal is reduced.

Accordingly, the present invention is a novel current collector design in which the open areas of the grid pattern are not symmetric and not constant in size and orientation. Additionally, the solid elements of the conductor grid are oriented such that they converge at a common focal point. In that manner, if the solid material within the conductor grid is modeled as a wire, then a well known equation for total resistance is, $$R = pL/A$$

where, p is the resistance of the conductor material, L is the conductor length and A is the cross sectional area of the conductor. Reducing L reduces R.

In that light, the internal resistance of the present current collector is reduced with respect to conventional designs by providing a more direct path to the connector tab. The improved grid structure has a fan-like configuration of radiating conductors so that every portion of the current collector is either along a straight, radiating path to the connector tab or, is relatively proximate a radiating conductor.

These and other aspects of the present invention will become increasingly more apparent to those skilled in the art by reference to the following description and the appended drawings.

DETAILED DESCRIPTION OF THE PREFERRED EMBODIMENTS

Figure 1:
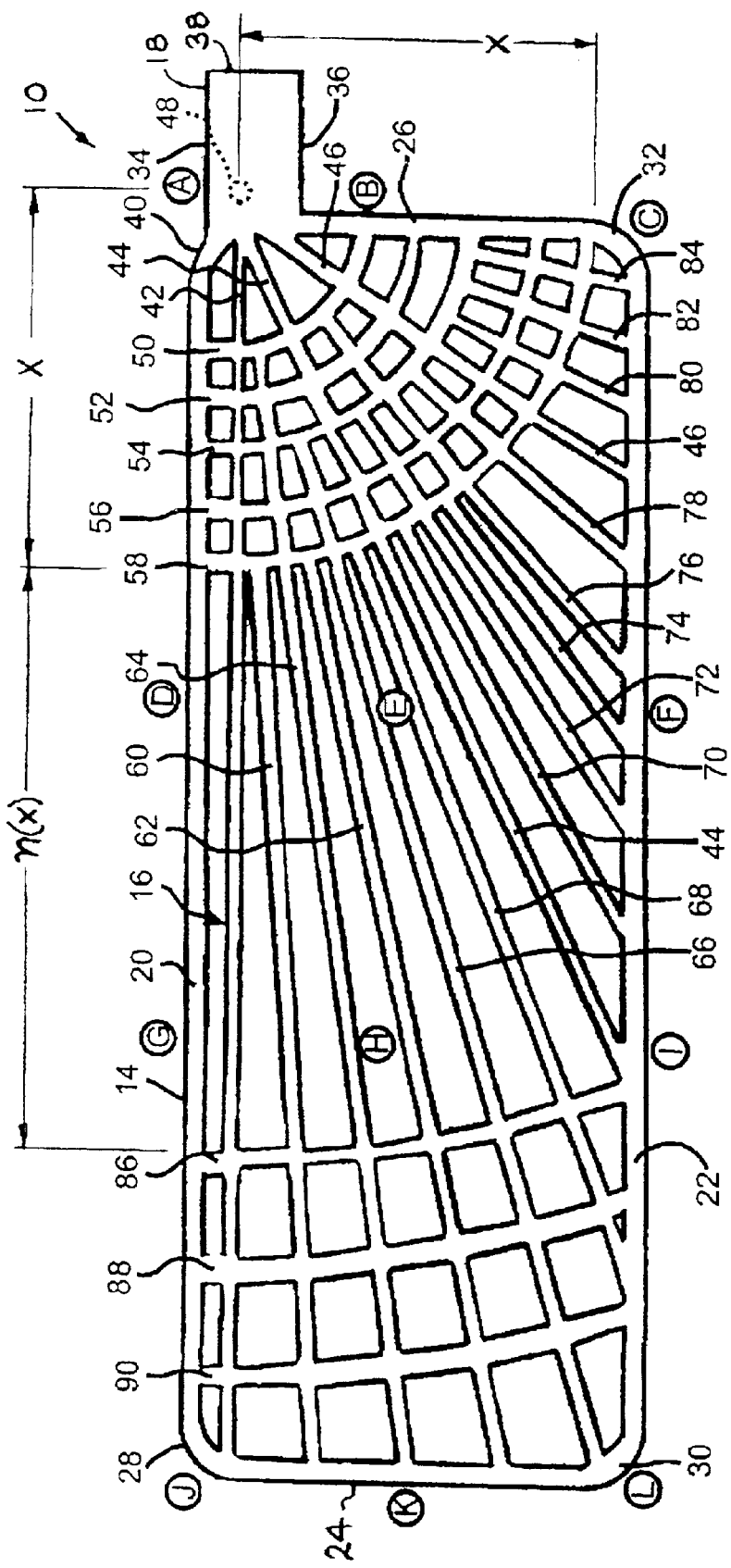
FIG. 1 is a plan view of a current collector 10 according to the present invention.
Figure 2:
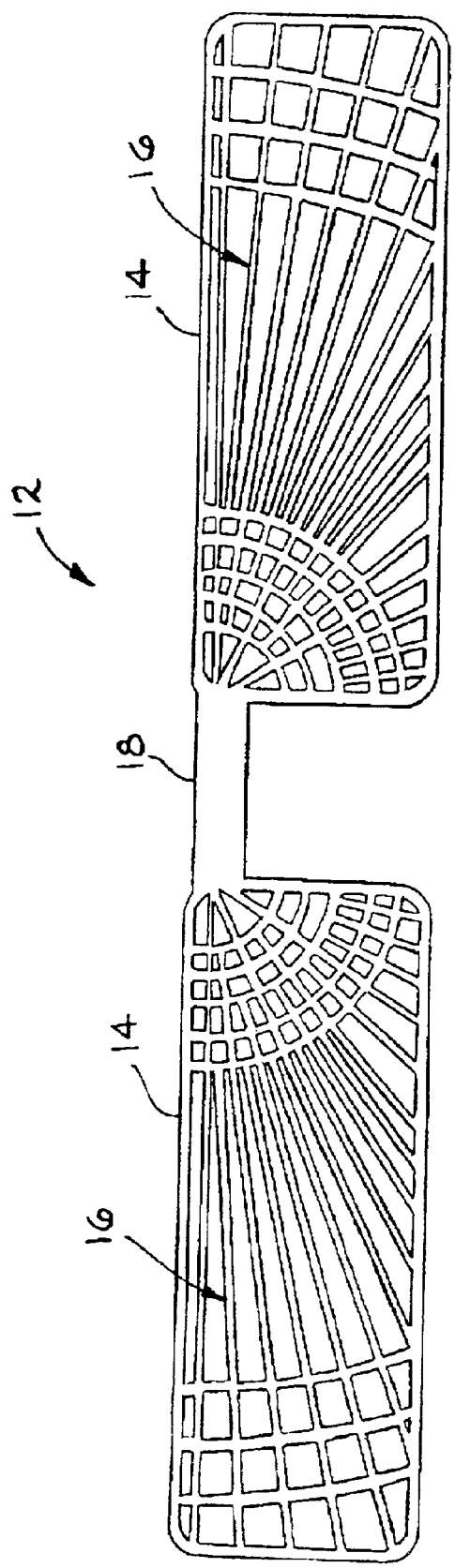
FIG. 2 is a plan view of a double winged current collector 12 according to the present invention.
Figure 3:
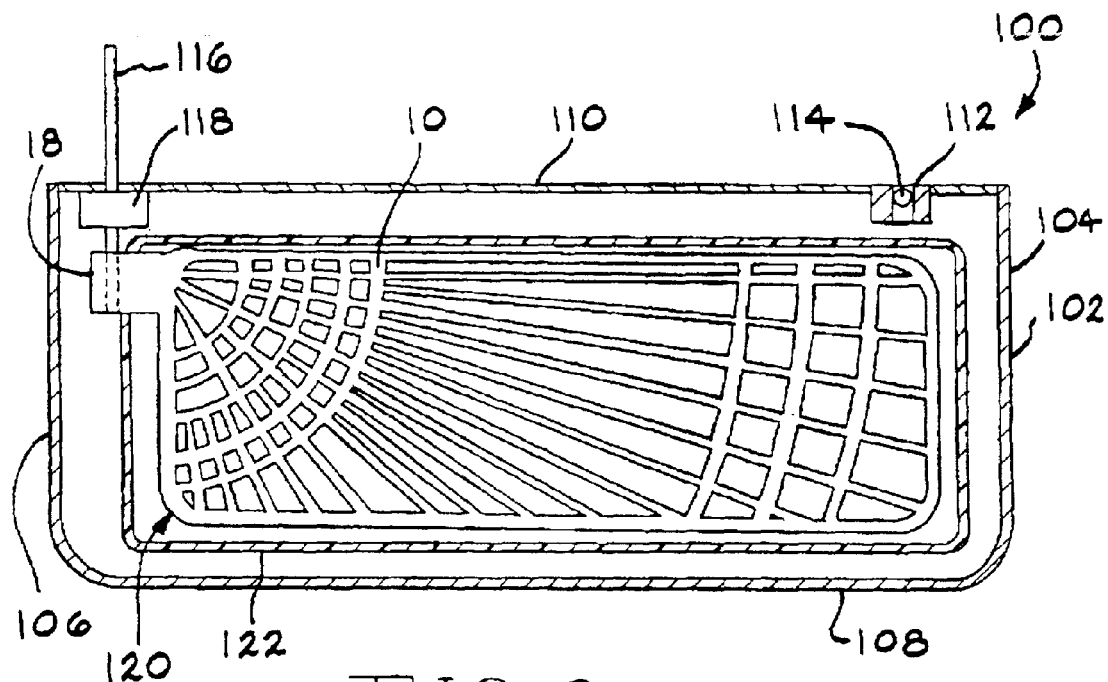
FIG. 3 is an elevational view of the present current collector 10 incorporated into an electrochemical cell 100.

Referring now to the drawings, FIG. 1 shows an enlarged view of one embodiment of a current collector 10 according to the present invention while FIG. 2 shows another embodiment of the present current collector 12 having a double wing configuration. FIG. 3 is of an exemplary electrochemical cell 100 of a multi-plate configuration comprising one of the present current collectors. Whether the current collector of the cell 100 is of the single wing configuration 10 or of the double wing type 12 is not necessarily important.

As shown in the enlarged view of FIG. 1, the current collector 10 generally comprises wire or bar-shaped conductor strands in the shape of a frame 14 surrounding a grid 16 and supporting a tab 18. The conductors and tab are of a conductive material such as nickel, aluminum, copper, stainless steel, tantalum, cobalt and titanium, and alloys thereof. As shown in this figure, the frame 14 has spaced apart upper and lower strands 20 and 22 extending to and meeting with left and right strands 24 and 26. Upper frame strand 20 meets left frame strand 24 at curved corner 28, left frame strand 24 meets lower frame strand 22 at curved corner 30 and lower frame strand 22 meets right frame strand 26 at curved corner 32.

Tab 18 is a generally solid planar member and extends outwardly from the junction of the upper frame strand 20 and the right frame strand 26. In that respect, tab 18 includes upper and lower sides 34 and 36 extending to and meeting with an intermediate edge 38. The tab sides 34 and 36 are parallel to each other and are generally parallel to the upper and lower frame strands 20, 22. However, the upper tab side 34 is spaced somewhat below the upper frame strand 20 to provide a curved junction 40 where the upper strand 20 transitions into the upper tab side 34. The lower tab side 36 meets the right frame strand 26 at a perpendicular angle.

The grid 16 is interior of and supported by the frame 14 and comprises a fan-shaped configuration of radial strands as conductors in the form of wires or elongate bars. The radial conductor strands are of two general types. Conductors 42, 44 and 46 begin at the tab 18 and radiate outwardly to terminate at either the left frame strand 24 (conductor 42) or the lower frame strand 22 (conductors 44 and 46). The other type of radial conductor begins at a position spaced from the tab 18 and radiates outwardly to terminate at either the left frame strand 24 or the lower frame strand 22. Regardless, both types of radial conductors have their terminus aimed at an imaginary focal point 48, indicated by the area outlined by the dashed lines, and residing on the tab 18.

The grid structure further comprises a first and a second group of curved or concentric strands as conductors in the form of wires or elongated bars. The first group includes conductors 50, 52, 54, 56 and 58, which are at progressively greater distances from the focal point 48 and concentric therewith. Each of the first group of concentric conductors extends from the upper frame strand 20 to the right frame strand 26 and intersects with each of the radial conductors 42, 44 and 46 emanating from the focal point 48 of tab 18. Other of the radial conductors do not begin at the tab 18, but radiate outwardly from various ones of the first group of concentric conductors. In that respect, radial conductors 60 and 62 both begin at concentric conductor 58 while radial conductor 64, intermediate conductors 60 and 62, begins at concentric conductor 50. Conductors 60, 62 and 64 terminate at the left frame strand 24. Radial conductor 66 begins at concentric conductor 54 and terminates in the vicinity of the curved corner 30 between the left frame strand 24 and the bottom frame strand 22.

The remaining radial conductors 68, 70, 72, 74, 76, 78, 80, 82 and 84 begin at various ones of the first group of concentric conductors, but terminate at the lower frame strand 22. In that respect, radial conductor 68 begins at concentric conductor 58. Moving downwardly and towards the right frame strand 26 in FIG. 1, conductor 70, which is adjacent to focal point radial conductor 44, begins at concentric conductor 58. Radial conductors 72 and 74 begin at concentric conductors 54 and 58, respectively. Radial conductor 76 begins at concentric conductor 50, and radial conductor 78 begins at concentric conductor 54. Finally, conductors 80, 82 and 84 begin at concentric conductor 54 and terminate at the lower frame strand 22. Focal point radial conductor 46 is directly adjacent to radial conductors 78 and 80.

The grid 16 is completed by the second group of curved strands comprising conductors 86, 88 and 90. As is the case with the first group of concentric conductors, these, too, are concentric with the focal point 48. However, they are spaced a substantial distance from the first group of concentric conductors 50, 52, 54, 56 and 58. The first group of concentric conductors 86, 88 and 90 extend from the upper frame strand 20 to the lower frame strand 22.

As shown in FIG. 1, the substantial distance from the first group of concentric conductors to the second group is defined as a factor of "x". The distance x is defined as being from the focal point 48 to the outer most radial conductor 58 of the first group. Then, the distance from radial conductor 58 to the first one of the second group of radial conductors 86 is n(x) with n ranging from about 1 to about 10, and fractions thereof.

In the current collector 10 shown, the substantial distance between the two groups of radial conductors is measured along upper frame stand 20. However, it is contemplated by the scope of the present invention that the current collector need not necessarily have the generally rectangular frame shape shown. Instead, the frame can be squared, circular, or of some other irregular shape dictated by the design requirements of a specific cell construction. No matter what the specific shape of the current collector, according to the present invention, it has a series of radial conductors fanning out from a focal point and supported by spaced apart first and second groups of concentric conductors with the distance between the two groups of concentric conductors being at least "x", as measured is some direction from the focal point. A single concentric conductor is sufficient to constitute a group for the purpose of this invention.

Figure 1A:
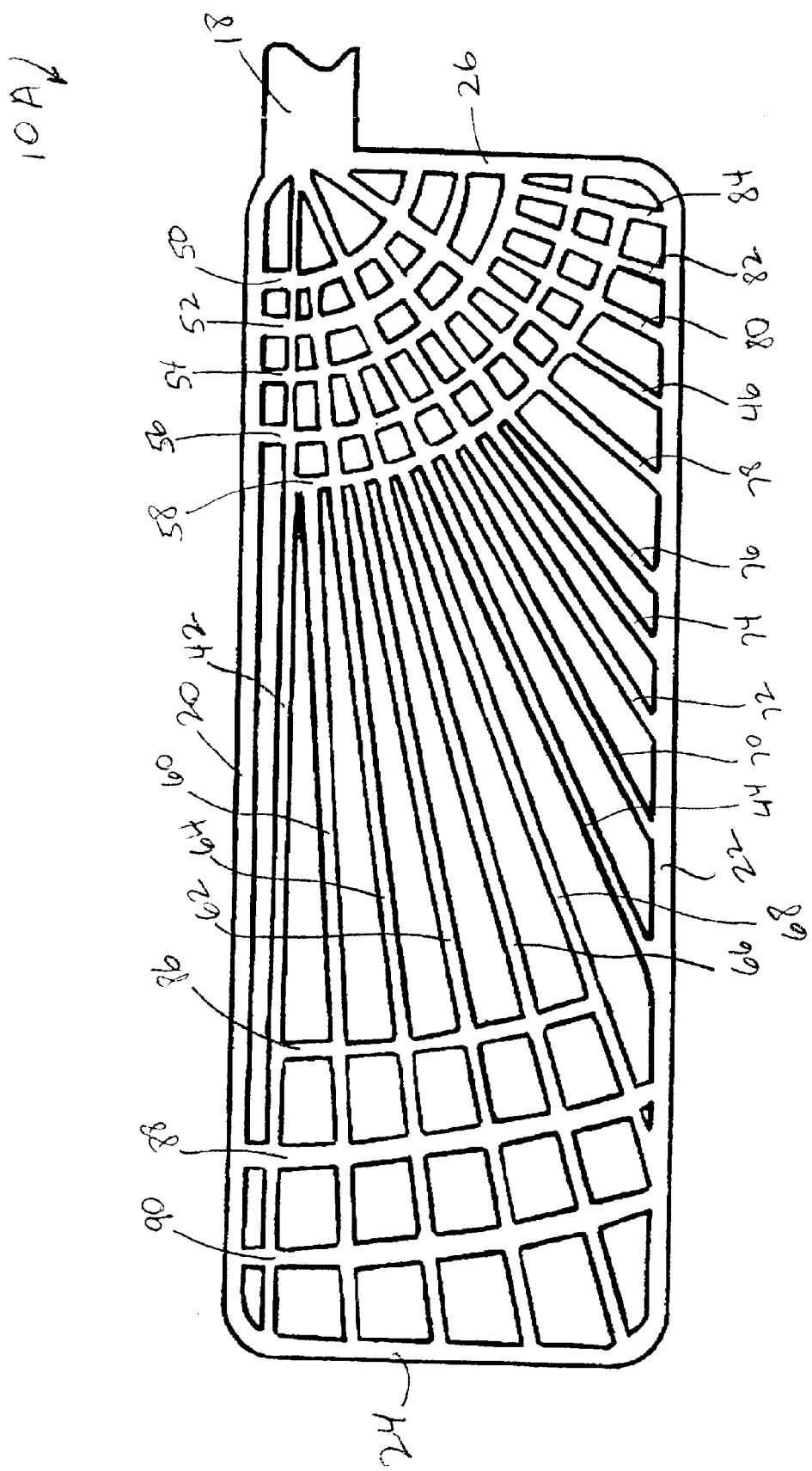
FIG. 1A is an alternate embodiment of a current collector 10A according to the present invention.

Also, a concentric conductor need not necessarily connect to the spaced apart portions of the frame. It is within the scope of the present invention that any one of the first group of concentric conductors 50, 52, 54, 56 and 58 and of the second group of concentric conductors 86, 88 and 90 can terminate at one of the radiating conductors 42, 44, 46, 60, 62, 64, 66, 68, 70, 72, 74, 76, 78, 80, 82 and 84 and, in that respect, not terminate at the frame. For example, in FIG. 1A the opposed ends of concentric conductor 58 terminate at radial conductors 42 and 84 instead of upper frame strand 20 and right frame strand 26, respectively. Similarly, the opposed ends of centric conductor 84 terminate at radial conductors 42 and 68 instead of upper frame strand 20 and lower frame strand 22, respectively.

The double wing current collector 12 of FIG. 2 is essentially comprised of two current collector portions, both having the numerical designation 14 and similar to current collector 10 of FIG. 1 as mirror images of each other. The mirror image current collectors 14 are positioned side-by-side connected together at a tab 18.

FIG. 3 shows the exemplary electrochemical cell 100 useful with either one of the current collectors 10, 12. For sake of clarity, the single wing collector 10 is shown. The cell includes a casing 102 having spaced apart front and back side walls (not shown) joined by side walls 104 and 106 and a planar bottom wall 108. The junctions between the various side walls and bottom wall are curved. A lid 110 closes the open top of the casing 102. Lid 110 has an opening 112 that serves as a port for filling an electrolyte (not shown) into the casing after the cell's internal components have been assembled therein and lid 110 has been sealed to the side walls. In the final and fully assembled condition, a sealing plug, such as a ball 114, is hermetically sealed in the electrolyte fill opening 112 to close the cell in a gas tight manner. The casing 102, lid 110 and sealing ball 114 are preferably of a conductive material. Suitable materials include nickel, aluminum, stainless steel, mild steel, nickel plated mild steel and titanium. Preferably, the casing, lid and sealing ball are of the same material.

A terminal lead 116 for one of the anode electrode and the cathode electrode is electrically insulated from the lid 110 and the casing 102 by a glass-to-metal seal 118. In a case-negative cell configuration, the lead 116 serves as the cathode terminal and the lid 110 and casing 102 serve as the negative or anode terminal, as is well known to those skilled in the art. A case-positive cell configuration has the positive electrode or cathode contacted to the casing 102 with the anode supported on the current collector 10 connected to the lead 116.

In either case, the exemplary cell 100 shown in FIG. 3 includes a central electrode 120 comprising the current collector 10 of the present invention supporting at least one of the opposite polarity active materials. For the sake of clarity, the active materials are not shown supported on the current collector 10. However, in a case-negative cell configuration, current collector 10 supports opposed layers of cathode active material contacting the opposite major sides thereof locked together through its many open areas. The tab 18 is then connected to the terminal lead 116 such as by welding. In a case-positive cell configuration, anode active material is locked together supported on the opposite major sides of the current collector.

The central electrode 120 of cell 100 is sealed in a separator envelope 122 to prevent direct contact with the opposite polarity electrode. While not shown in FIG. 3, in a case-negative design the opposite polarity electrode is the anode comprised of anode active material contacted to the inner major sides of the current collector 12 shown in FIG. 2. The wing portions 12A and 12B of collector 12, joined by the intermediate tab 18A, are folded downwardly toward each other with respect to tab 18A and into electrical association with the opposed major sides of the intermediate cathode. In a case-positive cell configuration, the opposed cathode plates are carried by the wing portions 12A, 12B and folded down toward each other and with respect to tab 18A into electrical association with the opposed major sides of the central anode.

A more thorough and complete discussion of a cell construction having a current collector comprising wing-like portions which are folded into electrical association with a central electrode of an opposite polarity is shown in U.S. Pat. No. 5,312,458 to Muffoletto et al. This patent is assigned to the assignee of the present invention and incorporated herein by reference.

The following example describes the manner and process of a current collector according to the present invention, and it sets forth the best mode contemplated by the inventors of carrying out the invention, but it is not to be construed as limiting.

Voltage measurements related to Rdc for a current collector 10 according to the present invention (FIG. 1) and for current collector 150 (FIG. 4) according to the prior art were recorded using a multimeter and constant current power source. The prior art current collector 150 was made of a similar conductive material as the present invention collector 10 and had a similar area, as shown in the plan views of FIGS. 1 and 4.

Current collector 150 is comprised of wire or bar-shaped conductor strands in the shape of a frame 152 surrounding a grid 154 and supporting a tab 156. The frame 152 has spaced apart upper and lower strands 158 and 160 extending to and meeting with left and right strands 162 and 164. Upper frame strand 158 meets left frame strand 162 at curved corner 166, left frame strand 162 meets lower frame strand 160 at curved corner 168 and lower frame strand 160 meets right frame strand 164 at curved corner 170.

The grid 154 is comprised of a plurality of intersecting wire or bar-shaped conductor strands 172 and 174. Conductors 172 are parallel to each other as are conductors 174. Conductors 172 extend from the upper frame strand 158 to either the lower frame strand 160 or the left frame strand 162 while conductors 174 extend from the upper frame strand 158 to either the lower frame strand 160 or the right frame strand 164. This provides the grid 154 having a plurality of diamond shaped openings 176, and portions thereof, formed between the intersecting conductors 172, 174.

Figure 4:
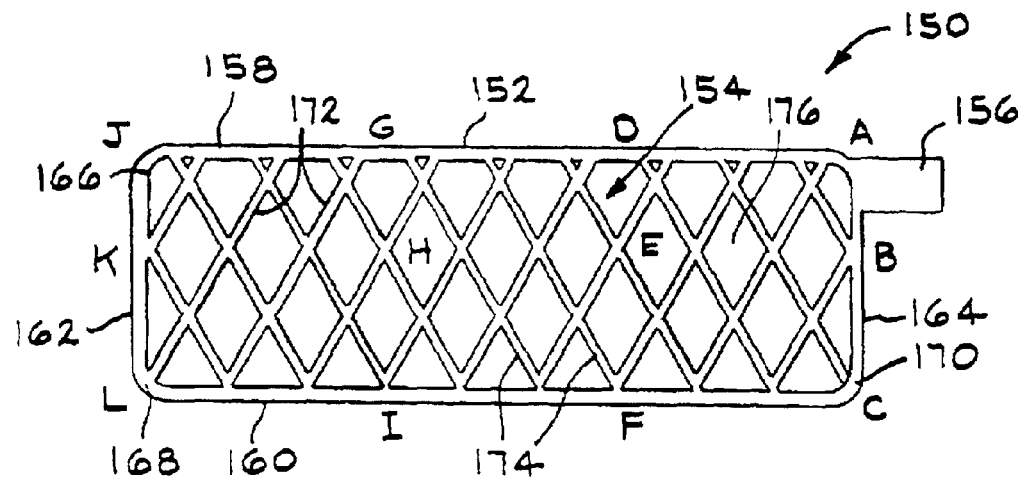
FIG. 4 is a plan view of a current collector 150 according to the prior art.
Figure 5:
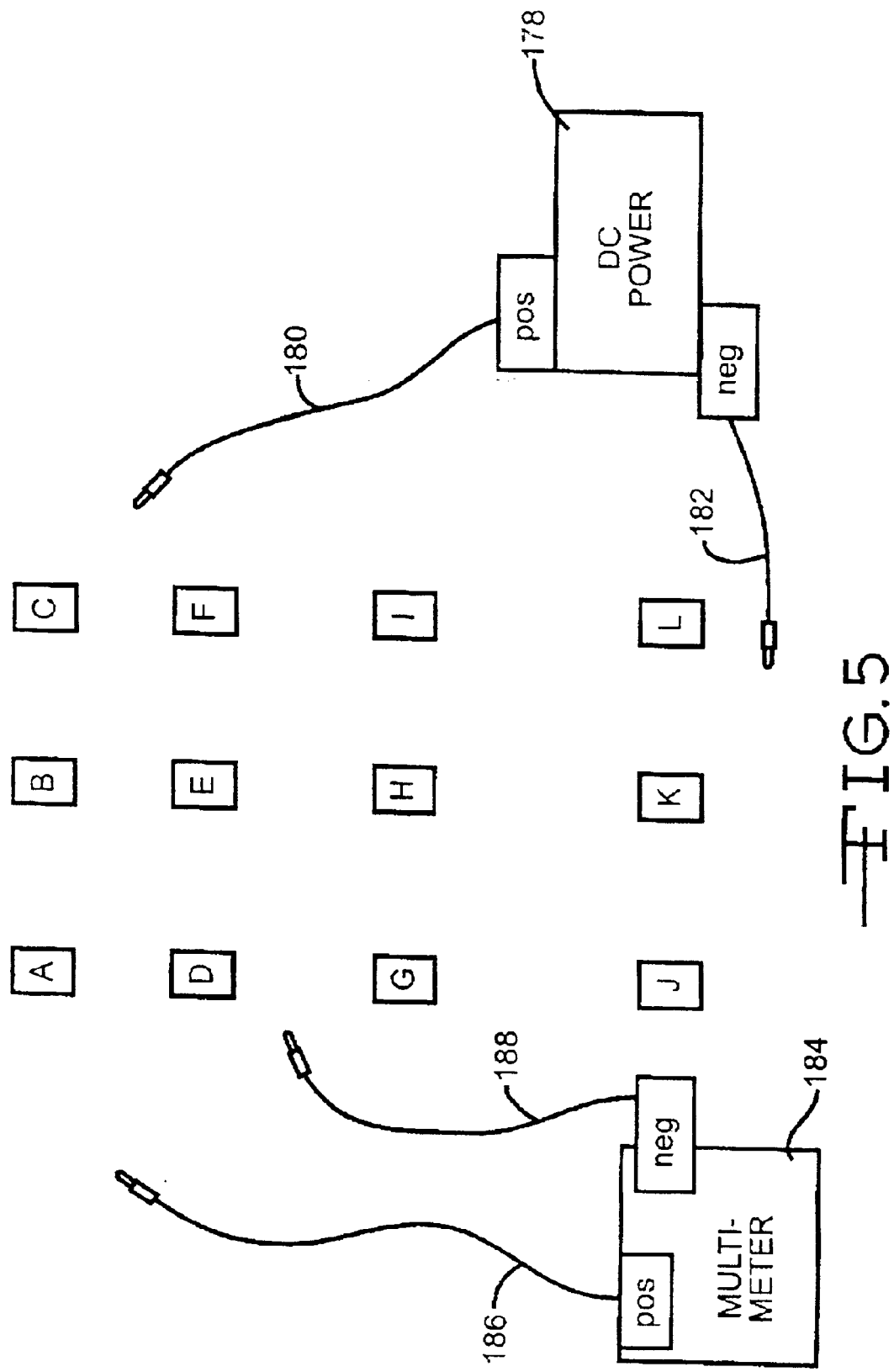
FIG. 5 is a schematic of a resistance test performed on the present current collector 10 and one according to the prior art 150 shown in FIG. 4.

To perform the comparative Rdc test, a power source 178 having positive and negative leads 180 and 182 (FIG. 5) was set at a current of 0.182 Amperes, which is equal to the current for one electrode plate in a typical battery powering an implantable medical device. Test nodes A, B, C, D, E, F, G, H, I, J, K and L, as indicated in FIGS. 1 and 4, were set up on the respective current collectors 10, 150. The positive lead 180 was placed on node C which corresponds to the focal point 48 of tab 18 of collector 10 and on the tab 156 of current collector 150. The negative lead 182 was then placed on the other nodes A, B and D to L. The voltage drop between these node points was measured using a multimeter 184 having positive and negative leads 186 and 188 by placing the positive multimeter lead on node C and the negative multimeter lead 188 on the node on which the negative power supply lead 182 was contacted.

Figure 6:
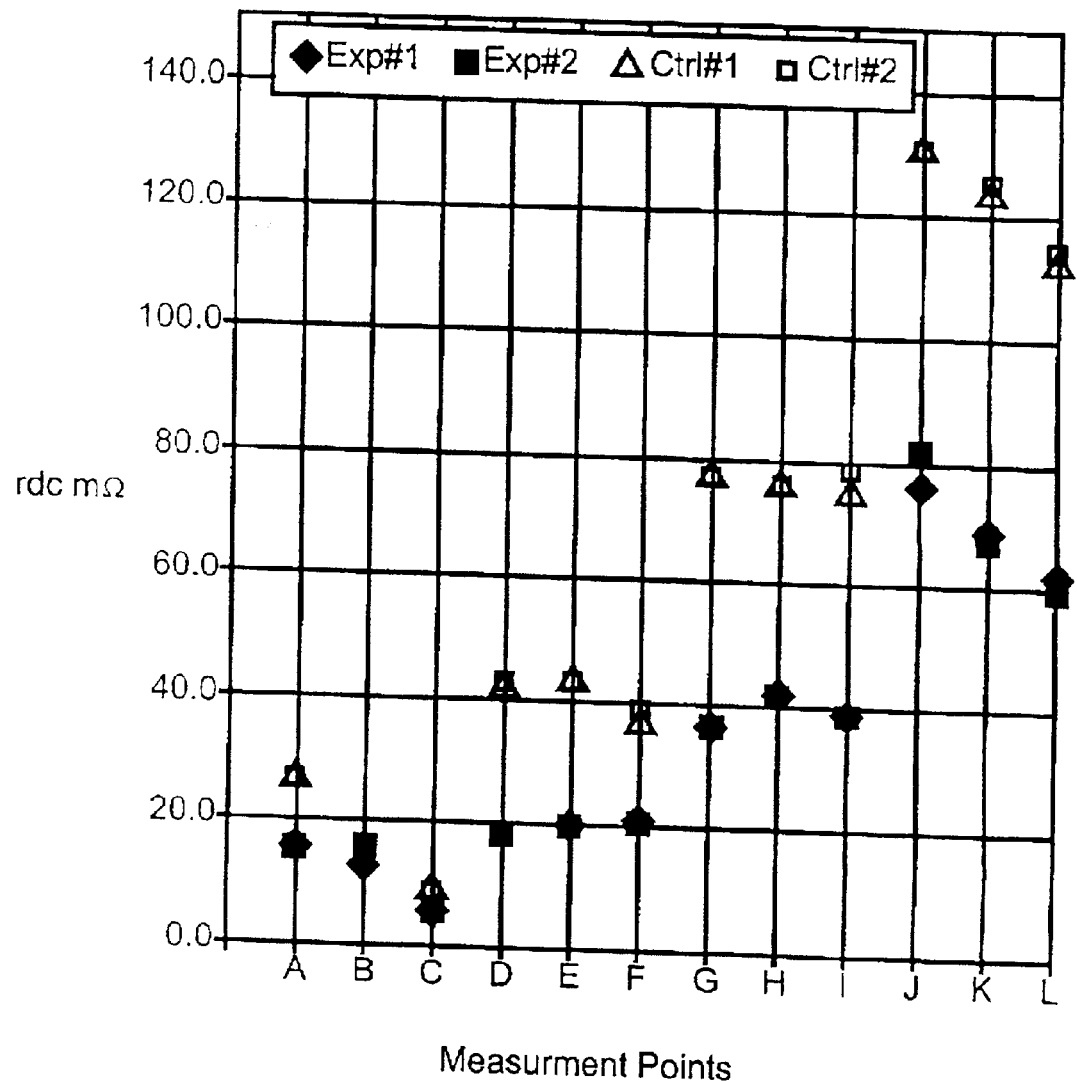
FIG. 6 is a graph of the resistance results from the test performed according to FIG. 5.

FIG. 6 is a graph of Rdc as a function of measured nodal point location for two of each of the current collectors 10,150. Since a constant current power source was used, the resistance can be computed by, $$R = V/I$$

where, V is the voltage drop and I is the current. Since R is a factor of the total Rdc of the cell, the Rdc of one current collector plate is equal to R as computed above. The Rdc measurements for two current collectors of each of the present invention and the prior art are set forth below in Table 1 and in the graph of FIG. 6. This data clearly illustrate that the novel current collectors 10, 12 of the present invention have significantly lower Rdc than the prior art current collector 150 described in FIG. 4. This, in turn, lowers total battery Rdc to improve overall battery and device performance.

TABLE 1

| Meas Pt | Present Invention #1 | Present Invention #2 | Prior Art #1 | Prior Art #2 |
| --- | --- | --- | --- | --- |
| A | 15.1 | 15.3 | 26.5 | 24.9 |
| B | 12.4 | 15.0 | 15.0 | 15.4 |
| C | 5.2 | 5.1 | 8.8 | 8.4 |
| D | 18.5 | 18.7 | 42.0 | 42.8 |
| E | 19.5 | 19.8 | 43.7 | 42.9 |
| F | 19.9 | 19.6 | 37.6 | 39.2 |
| G | 36.2 | 35.8 | 78.1 | 78.1 |
| H | 41.5 | 40.8 | 76.5 | 76.3 |
| I | 38.0 | 37.4 | 74.5 | 77.9 |
| J | 75.8 | 80.9 | 130.8 | 130.7 |
| K | 68.0 | 66.4 | 123.6 | 125.3 |
| L | 61.5 | 59.0 | 112.9 | 114.1 |

Since the theory of this invention has been proven using the mathematical relations described herein, it can be applied to any battery construction technique, namely, the multiple plate and wound cell stack described above.

It is appreciated that various modifications to the present inventive concepts described herein may be apparent to those of ordinary skill in the art without departing from the spirit and scope of the present invention as defined by the herein appended claims.

What is claimed is:

1. A current collector, which comprises:
   a) a frame comprising at least one frame conductor providing a closed perimeter;
   b) a plurality of first radiating conductors radiating from a focal point on the frame and terminating at the frame perimeter spaced from the focal point;
   c) a first group of at least two first concentric conductors being concentric with the focal point, the first group of concentric conductors extending from and meeting with spaced apart first and second frame portions of the frame perimeter and intersecting the plurality of radiating conductors;

d) a second group of at least two second concentric conductors being concentric with the focal point, the second group of concentric conductors extending from and meeting with spaced apart third and fourth frame portions of the frame perimeter and intersecting the plurality of radiating conductors; and e) wherein from the focal point to an outer most one of the first concentric conductors is a distance "x" and from the focal point to a nearest most one of the second concentric conductors is from about 1x to about 10x, and wherein there are no concentric conductors intermediate the outer most one of the first concentric conductors and the nearest most one of the second concentric conductors.

2. The current collector of claim 1 wherein there are more than two of the first concentric conductors.

3. The current collector of claim 1 wherein there are more than two of the second concentric conductors.

4. The current collector of claim 1 wherein there are a plurality of second radiating conductors radiating from at least one of the conductors of the first group of concentric conductors to at least one of the conductors of the second group of concentric conductors and focused at the focal point, and wherein the second radiating conductors do not radiate from the focal point.

5. The current collector of claim 1 wherein the focal point resides on a collector tab extending outwardly from the frame.

6. The current collector of claim 1 wherein the frame has a generally rectangular shape comprised of spaced apart first and second frame conductors extending to and meeting with third and fourth frame conductors, and wherein the first and second frame conductors are longer than the third and fourth frame conductors.

7. The current collector of claim 6 wherein the focal point resides on a collector tab extending from the junction of one of the first and second frame conductors meeting one of the third and fourth frame conductors.

8. The current collector of claim 1 of a conductive material selected from the group consisting of nickel, copper, titanium, cobalt, tantalum, aluminum and stainless steel, and alloys thereof.

9. A current collector, which comprises:

a) a frame comprising at least one frame conductor providing a closed perimeter;

b) a plurality of first radiating conductors radiating from a focal point on the frame and terminating at the frame perimeter spaced from the focal point;

c) a first group of at least two first concentric conductors being concentric with the focal point, the first group of concentric conductors intersecting the plurality of radiating conductors;

d) a second group of at least two second concentric conductors being concentric with the focal point, the second group of concentric conductors intersecting the plurality of radiating conductors; and e) wherein from the focal point to an outer most one of the first concentric conductors is a distance "x" and from the focal point to a nearest most one of the second concentric conductors is from about 1x to about 10x, and wherein there are no concentric conductors intermediate the outer most one of the first concentric conductors and the nearest most one of the second concentric conductors.

10. The current collector of claim 9 wherein at least one of the first concentric conductors extends from and meets with at least one of the spaced apart first and second frame portions of the frame.

11. The current collector of claim 9 wherein at least one of the second concentric conductors extends from and meets with at least one of the spaced apart third and fourth frame portions of the frame.

12. The current collector of claim 9 wherein there are more than two of the first concentric conductors.

13. The current collector of claim 9 wherein there are more than two of the second concentric conductors.

14. The current collector of claim 9 wherein there are a plurality of second radiating conductors radiating from at least one of the conductors of the first group of concentric conductors to at least one of the conductors of the second group of concentric conductors and focused at the focal point, and wherein the second radiating conductors do not radiate from the focal point.

15. The current collector of claim 9 wherein the focal point resides on a collector tab extending outwardly from the frame.

16. A method for providing an electrochemical cell, comprising the steps of:

a) providing a first current collector comprising: a frame comprising at least one frame conductor providing a closed perimeter; a plurality of first radiating conductors radiating from a focal point on the frame and terminating at the frame perimeter spaced from the focal point; a first group of at least two first concentric conductors being concentric with the focal point, the first group of concentric conductors extending from and meeting with spaced apart first and second frame portions of the frame perimeter and intersecting the plurality of radiating conductors; a second group of at least two second concentric conductors being concentric with the focal point, the second group of concentric conductors extending from and meeting with spaced apart third and fourth frame portions of the frame perimeter and intersecting the plurality of radiating conductors, wherein from the focal point to an outer most one of the first concentric conductors is a distance "x" and from the focal point to a nearest most one of the second concentric conductors is from about 1x to about 10x, and wherein there are no concentric conductors intermediate the outer most one of the first concentric conductors and the nearest most one of the second concentric conductors;

b) contacting a first electrode active material to at least one of a first and second major sides of the first current collector connected to a first terminal to provide a first electrode;

c) electrically associating the first electrode with a second counter electrode connected to a second terminal and housed inside of a casing; and d) activating the first and second electrodes with an electrolyte.

17. The method of claim 16 including providing the second electrode comprised of a second electrode active material contacted to a second current collector comprised of two of the first current collectors in a side-by-side, double wing configuration with an intermediate tab and having the second electrode active material contacted to at least one major side of each of the wings of the second current collector, and wherein the first electrode is provided intermediate the wings of the second electrode and folding the wings towards the first electrode to electrically associate the first electrode with the second electrode separated from each other by a separator.

* * * * *